United States Patent [19]

Takayama et al.

[11] Patent Number: 5,260,845
[45] Date of Patent: Nov. 9, 1993

[54] MAGNETIC HEAD HAVING A THIN FILM CONDUCTOR COIL ASSEMBLY FORMED SEPARATE FROM A MAGNETIC HEAD CORE

[75] Inventors: Akio Takayama; Motoji Egawa, both of Iwata, Japan; Edward L. Packard, San Marcos, Calif.

[73] Assignee: Minebea Co., Ltd., Nagano, Japan

[21] Appl. No.: 874,092

[22] Filed: Apr. 27, 1992

[30] Foreign Application Priority Data

Apr. 30, 1991 [JP] Japan .................................. 3-126817
May 29, 1991 [JP] Japan .................................. 3-153934

[51] Int. Cl.⁵ .............................................. G11B 5/60
[52] U.S. Cl. ...................................... 360/103; 360/126
[58] Field of Search ........................ 360/103, 125-126

[56] References Cited

U.S. PATENT DOCUMENTS 4,962,437  10/1990  Wilcox .................................. 360/103

Primary Examiner—A. J. Heinz
Attorney, Agent, or Firm—Oliff & Berridge

[57] ABSTRACT

A magnetic head which can be miniaturized while maintaining the performance thereof includes a thin film conductor coil assembly having a magnetic core connected magnetically to magnetic substances and stepping across a non-magnetic substance located between the magnetic substances of a substrate and a thin film conductor coil formed with the magnetic core as a thin film magnetic core. This thin film conductor coil assembly is attached to a slider provided with a magnetic head core. The magnetic head core includes an I-core in which magnetic substances are formed on both sides of a non-magnetic substance, and a U-shaped core composed of a magnetic substance, formed together in one integral body with a magnetic gap provided therein. This magnetic head core is fitted into a slit in the slider, and the thin film conductor coil assembly is attached thereon. With this construction, it is possible to form the thin film conductor coil into a thin film and to enlarge the magnetic path area, thereby to miniaturize the magnetic head while maintaining the performance thereof.

11 Claims, 16 Drawing Sheets

MAGNETIC HEAD HAVING A THIN FILM CONDUCTOR COIL ASSEMBLY FORMED SEPARATE FROM A MAGNETIC HEAD CORE

BACKGROUND OF THE INVENTION

1. Field of the Invention

The present invention relates to a magnetic head in which a conductor coil of the magnetic head is provided as a thin film conductor coil assembly, thereby to improve recording and reproducing characteristics of the magnetic head and also to facilitate miniaturization, and to offset external noises.

2. Description of the Related Art

In a conventional magnetic head, a magnetic head 3 is provided on a slider 2 forming rails 1 as shown in FIG. 20 thru FIG. 22. This magnetic head 3 consists of an I-core 4 and a U-shaped core 5, and an insulated coil 6 is wound around either the I-core 4 or the U-shaped core 5 (I-core 4 in FIG. 21). Further, a very small gap 7 is provided between the I-core 4 and the U-shaped core 5 so that a magnetic path 8 is formed between the I-core 4 and the U-shaped core 5. Inclined faces 9 on the air outflow side and inclined faces 10 on the air inflow side are formed on the rails 1 as shown in FIG. 20, so that the slider 2 is floated. Further, a wide space portion 11 is formed in the U-shaped core 5 so that the coil 6 may be wound around. In addition, the U-shaped core 5 such as shown in FIG. 25 is provided so as to project from an end surface of the slider 2 in a similar manner as in conventional examples shown in FIG. 23 and FIG. 24, and the coil 6 is wound around the U-shaped core 5. As to the other portions, the same symbols are assigned to those that are the same as FIG. 20 thru FIG. 22 and description thereof is omitted herein.

Magnetic recording has a tendency of densification at present. Therefore, the magnetic head has to be made small in size and light in weight in order to cope with such densification of the magnetic recording. However, the above-described conventional magnetic head has the following problems when the magnetic head is made small in size and light in weight.

Namely, the I-core and the U-shaped core also become small in size for miniaturizing a conventional magnetic head. Thus, since the space portion becomes too small to wind the coil around the small I-core or U-shaped core, a very fine coil has to be used. Thus, there have been such problems that the coil is broken in a coil winding process, insulation covering is peeled off, and inferior goods are generated, thus causing poor yield and low reliability. Further, it may be considered to wind the coil by hand as a countermeasure against the problems of yield and reliability, but there is a problem that the productivity is low. Because of such reasons, there has been a limit for making a magnetic head small in size and light in weight from a structural point of view in a magnetic head using a coil wound type conductor coil, thus making it impossible to sufficiently cope with densification of magnetic recording. Thus, a thin film magnetic head has been developed at present in order to solve these problems.

In the above-described thin film magnetic head, a magnetic head member 12 having a thin thickness of t has been provided at one end of the slider 2 as shown in FIG. 26. In this magnetic head member 12, gaps 7 are formed so as to form magnetic circuits 13 within the thin thickness of t as shown in FIG. 27.

The problems of a magnetic head using the above-described conventional coil winding type conductor coil are solved for the time being by means of the above-described thin film magnetic head member, but the following problems are encountered. Namely, since the magnetic circuits 13 are formed in the magnetic head member 12 having the thin thickness of t in the above-described conventional thin film magnetic head, the sectional area of the magnetic circuit becomes smaller and magnetic resistance is increased, thus causing a problem that induced electromotive force is reduced and recording and reproducing characteristics are lowered when the area of the magnetic circuit becomes smaller and the magnetic resistance is increased.

When this is explained theoretically, magnetic flux $\Phi$ of a magnetic core is proportional to a number of turns N and an electric current i of the coil, and is in reverse proportion to magnetic resistance Rm. When this relationship is formularized with an expression, $\Phi = Ni/Rm$ is obtained. Thus, it is required to make the magnetic circuit area larger and the magnetic resistance Rm smaller in order to increase the magnetic flux $\Phi$. On the other hand, the induced electromotive force e required for reproduced output is proportional to the time differential of the magnetic flux $\Phi$. When this is formularized with an expression, $e = -N \times d\Phi/dt$ is obtained. It is required to increase the magnetic flux $\Phi$ in order to increase the induced electromotive force e, and it is seen from the above expression that the magnetic resistance Rm has to be reduced by making the magnetic circuit area larger in order to increase the magnetic flux $\Phi$. When the magnetic circuit area is small as described above, the magnetic resistance is increased and the induced electromotive force is reduced, thus lowering recording and reproducing characteristics.

Further, there are the following problems with the miniaturization of a magnetic head. That is, the induced electromotive force e has to be increased in order to improve reproduced output characteristics. In order to increase the induced electromotive force e, it is required to increase the magnetic flux $\Phi$ by enlarging the magnetic circuit area as it is apparent from the above-mentioned expression, and to reduce the time t for reading information out of one recorded portion on a magnetic disc. In order to reduce this time t, a linear velocity V of the magnetic head has to be accelerated. Namely, since the linear velocity V is a product of a distance L from the position of the magnetic head to the center of revolution of the magnetic disc by an angular rotational velocity $\omega$ of the magnetic disc, i.e., $V = \omega L$, L has to be increased in order to accelerate the linear velocity V of the magnetic head. Since the diameter of the magnetic disc has to be made smaller by the demand for miniaturization of a magnetic disc drive, however, the fact is that the distance L from the position of the magnetic head to the center of revolution of the magnetic disc cannot be determined large in miniaturization. Accordingly, to facilitate miniaturizing the magnetic disc, increasing the induced electromotive force e and improving reproduced output, there is no choice but to increase the magnetic flux $\Phi$ by enlarging the magnetic circuit area, thus causing such a problem that a conventional thin film magnetic head having a small magnetic circuit area cannot sufficiently correspond to a miniaturized magnetic disc.

Balance winding of a coil is ideal for offsetting external noises, but, in a conventional thin film magnetic head, a magnetic circuit is formed in a thin film core so as to form a conductor coil and a core as one body into a thin film. Therefore, it is impossible to perform balance winding of a coil. As a result, there is such a problem that external noises cannot be offset.

It is an object of the present invention to provide a magnetic head in which, instead of forming both the conductor coil and the core as above-mentioned conventional thin film magnetic head, only the conductor coil is formed in a thin film, thereby to make the magnetic circuit area sufficiently large so as to reduce the magnetic resistance, to improve recording and reproducing characteristics, to facilitate miniaturization and also balance winding of a coil possible thereby to offset external noises, thus improving yield, reliability and productivity of a coil winding type magnetic head at the same time.

SUMMARY OF THE INVENTION

Means for solving the above-described subjects is characterized in that a thin film conductor coil assembly includes a substrate in which magnetic substances are formed in one body on both sides of a non-magnetic substance, a magnetic core connected magnetically to the magnetic substances located on both sides of the non-magnetic substance so as to step across the non-magnetic material of the substrate, and a thin film conductor coil formed with the magnetic core as thin film magnetic core. An I-core is formed by forming magnetic substances in one body on both sides of a non-magnetic material, and a magnetic gap is provided between the magnetic substance on one side of the I-core and a U-shaped core to define an integral magnetic head core The magnetic head core is fitted as one body into a slit formed in a slider portion composed of a non-magnetic substance having floatation rails, and the thin film conductor coil assembly is attached to the fitted magnetic head core so that the magnetic substance and the non-magnetic substance forming the I-core and the magnetic substance and the non-magnetic substance of the thin film conductor coil assembly substrate are placed in contact with one another.

With such a structure described above, the present invention has the following operation. Namely, stepping across the non-magnetic substance of the thin film conductor coil assembly substrate, a magnetic core is connected magnetically with the magnetic substances of the substrate, and a thin film conductor coil is formed with this magnetic core functioning as a thin film magnetic core. Thus, it becomes possible to produce the thin film conductor coil only as a thin film conductor coil assembly separately from the magnetic head core.

On the other hand, it becomes possible to produce the magnetic head core separately from the conductor core of the thin film conductor coil assembly by forming an I-core with magnetic substances formed on both sides of a non-magnetic substance and a U-shaped core composed of a magnetic substance in one body, with a magnetic gap provided between the non-magnetic substance on one side of the I-core and the U-shaped core.

Then, the magnetic head core is fitted into a slit formed in the slider portion which is composed of a non-magnetic substance having floatation rails, and the thin film coil assembly is attached to the fitted magnetic head core so that the magnetic substance and the non-magnetic substance forming the I-core of the magnetic head core and the magnetic substance and the non-magnetic substance forming the substrate of the thin film coil assembly are respectively placed in contact with one another, thereby to form a magnetic path through the magnetic core of the thin film conductor coil, the magnetic substance of the substrate, the magnetic substance of the the magnetic head core and the gap.

As described above, the thin film conductor coil and the magnetic head core are produced individually, and the magnetic path is formed through the magnetic substance forming the substrate of the thin film conductor coil and the magnetic substance forming the magnetic head core. Thus, it becomes possible to miniaturize the thin film conductor coil, and the area of the magnetic circuit is determined by selecting the configuration and dimensions of the magnetic substance of the magnetic head core and the substrate of the thin film conductor coil optionally, thereby to obtain a required magnetic circuit area. Further, since the thin film conductor coil is formed with the magnetic core as the core, balance winding of the thin film conductor coil becomes possible.

DESCRIPTION OF PREFERRED EMBODIMENTS

Figure 1:
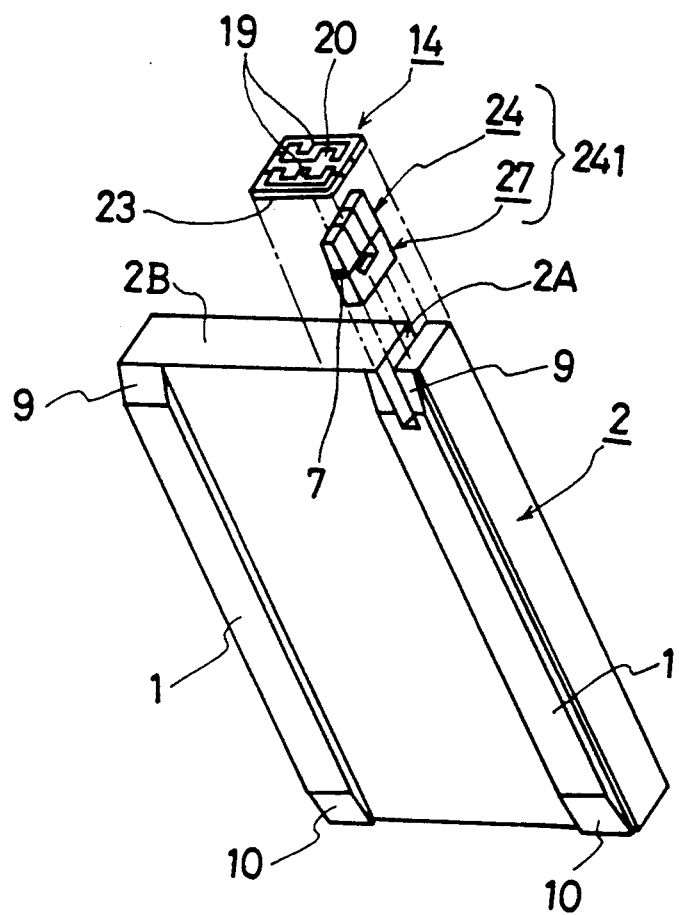
FIG. 1 is a perspective view showing an embodiment of the present invention.

An embodiment of the present invention will be described hereinafter with reference to the drawings. When the whole structure of a magnetic head is described with reference to FIG. 1, a slider 2 is formed of a quadrilateral non-magnetic substance having a predetermined thickness, and floatation rails 1 parallel to one side of the quadrilateral are provided. A slit 2A is formed on a side surface 2B orthogonal to the floatation rails 1 of the slider 2, and a magnetic head core 241 formed by adhering an I-core 24 and a U-shaped core 27 (described later) with a non-magnetic substance (to form an integral body) is inserted into the slit 2A and adhered thereto by glass bonding for instance which is a non-magnetic substance. Further, a substrate 23 of a thin film conductor coil assembly 14 (which will be described later) is adhered to the side surface 2B of the slider 2 and an upper surface of the I-core 24 by glass bonding or resin adhesive thereby to form a magnetic head. 9 represents air outflow side inclined surfaces, and 10 represents air inflow side inclined surfaces.

Figure 2:
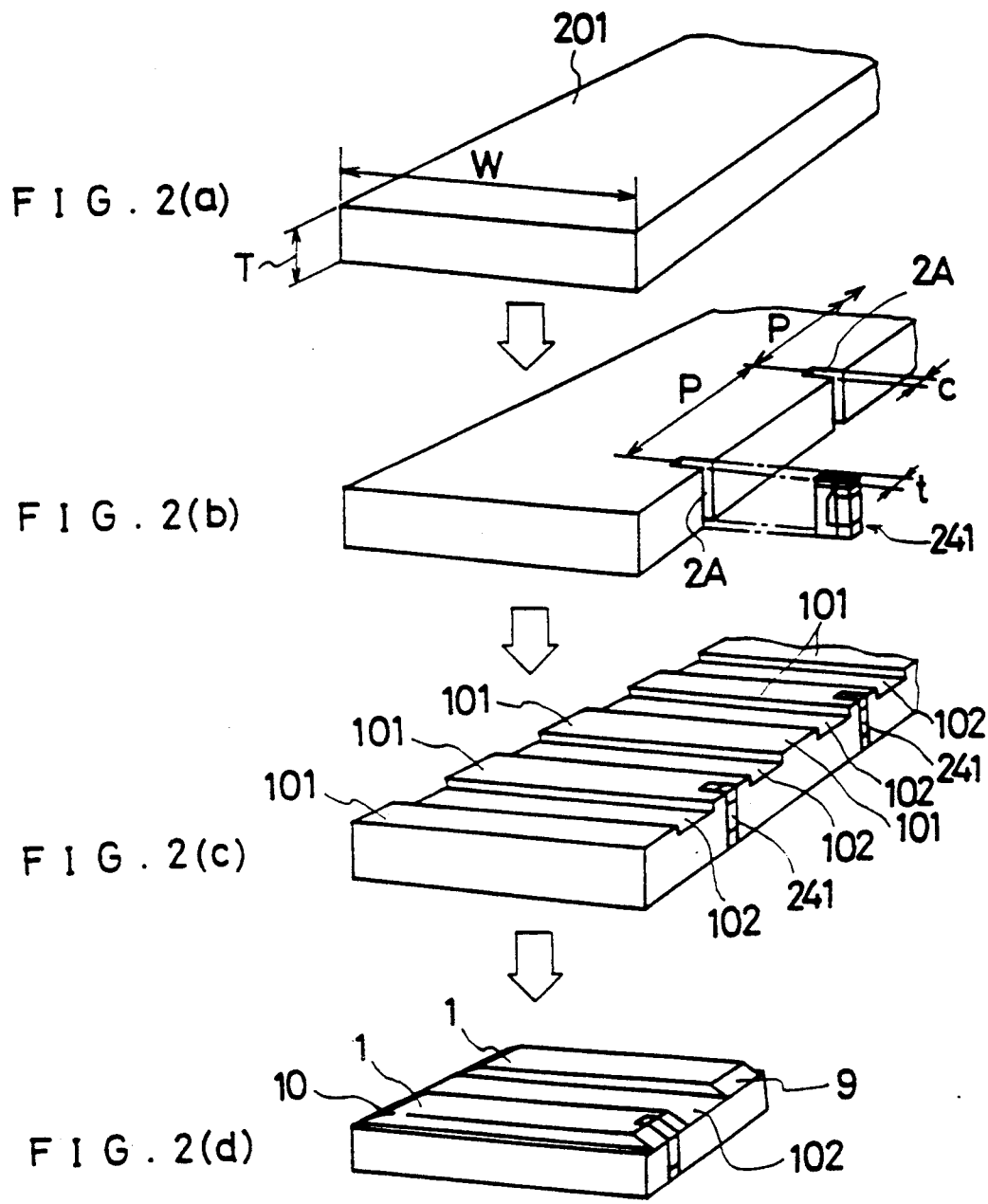
FIGS. 2(a)-2(d) are perspective views showing a production process of a slider in FIG. 1.
Figure 3:
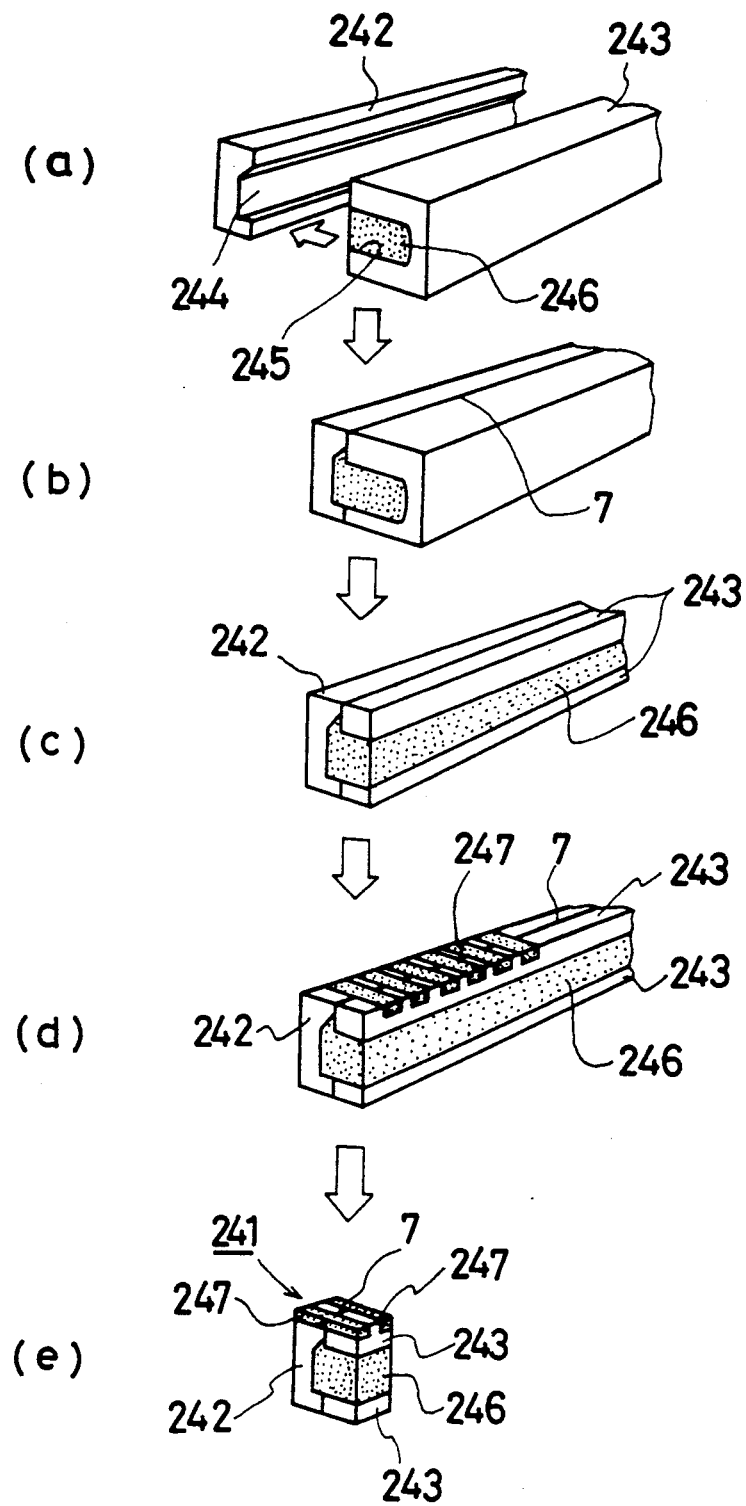
FIGS. 3(a)-3(e) are perspective views showing a production process of a magnetic head core in FIG. 1.
Figure 7:
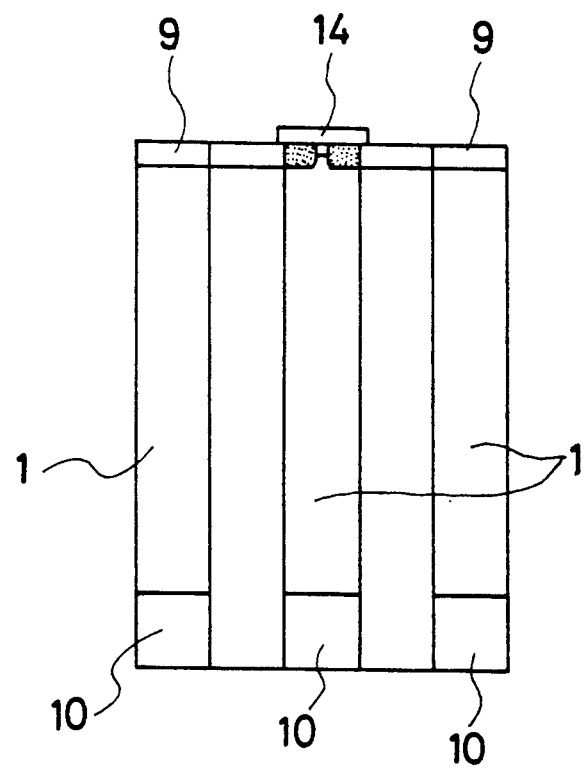
FIG. 7 is a plan view of FIG. 6.
Figure 8:
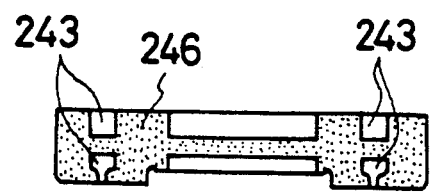
FIG. 8 is a front view showing an example of a slider having two floatation rails.
Figure 9:
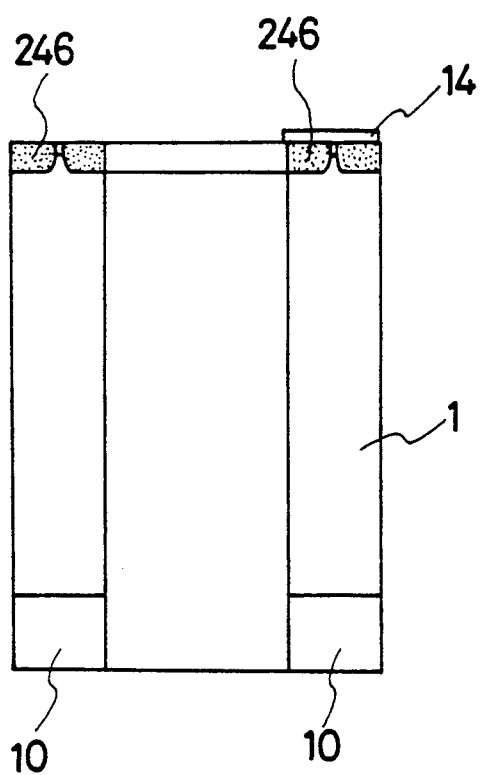
FIG. 9 is a plan view of FIG. 8.

Next, the production of the slider 2 will be described with reference to FIGS. 2(a)-2(d). First, the slits 2A having a channel width C suited for the thickness t of the magnetic head core 241 are processed at a predetermined pitch interval P in a process (b) on an end surface of a raw material 201 composed of a non-magnetic substance having a predetermined thickness T and a predetermined width W. The magnetic head core 241 is fitted into the slit 2A and fixed thereto by adhering with glass bonding or resin adhesive. Then, a groove 102 is processed so as to form a rail portion 101 in a process (c). The rail portion 101 is cut at the part of the groove portion 102, and the air outflow side inclined surface 9 and the air inflow side inclined surface 10 are processed in a next process (d), thus completing the slider 2 provided with two floatation rails 1 and with the magnetic head core 241. The embodiment shown in FIG. 2 shows a slider 2 provided with two floatation rails 1 and mounted with the magnetic head core 241 on one of these floatation rails 1, but there are variety types of sliders such as a slider in which three floatation rails 1 are provided and the magnetic head core is mounted on the central floatation rail 1 as shown in FIG. 7 or a slider in which a magnetic head core is mounted on each of two floatation rails 1 as shown in FIG. 9. Therefore, the pitch P of the slits 2A and the groove 102 are processed in accordance with these types of sliders. In such a manner, the slider 2 is produced automatically by machining.

Next, the production of the magnetic head core 241 will be described with reference to FIGS. 3(a)-3(e). A magnetic head raw material 242 composed of a magnetic substance forming a groove 244 and a magnetic head raw material 243 composed of a magnetic substance with a non-magnetic substance 246 such as glass bonding filled in a U shaped groove 245 are adhered to each other in one integral body with a non-magnetic substance such as glass bonding in a process (b). At the time of adhesion, adhesion is performed while providing a magnetic gap 7 between the magnetic head raw material 242 and the magnetic head raw material 243. Next, the magnetic head raw material 243 is excised until the non-magnetic substance 246 is exposed and mirror finished. Then, in a process (d), a slit is processed on a surface provided with the magnetic gap 7, a non-magnetic substance 247 such as glass bonding is filled in this slit, and this surface is mirror finished, and cut so as to leave the non-magnetic substance 247. Further, mirror finishing of the cut surface is performed in a process (e), so that the magnetic gap 7 is formed and the magnetic head raw materials 242 and 243 which are magnetic substances are exposed in a state where they are put between the non-magnetic substance 247, thus completing the magnetic head core 241 in which the magnetic head raw materials 242 and 243 are connected magnetically to each other through the non-magnetic substance 246. In such a manner, the magnetic head core 241 is produced automatically by machining.

Next, another embodiment of the slider 2 will be described with reference to FIG. 4. In this embodiment, a portion corresponding to the magnetic head core is provided in one body on the slider 2. Namely, in the case of this embodiment, the slider 2 is composed of a magnetic substance, and a part of the magnetic head core raw material 243 is exposed from the floatation rails 1 extending to the air outflow side inclined surfaces 9 and the side surface 2B and a part of the magnetic head core raw material 243 is also exposed putting the non-magnetic substance 246 therebetween. Then, a thin film conductor coil assembly 14 which is described later is attached thereto. 7 represents a magnetic gap.

This slider 2 is produced by a process shown in FIGS. 5(a)-5(g). First, in a process (a), a slider raw material 201 is a magnetic substance and a groove 244 is formed thereon. A magnetic head core raw material 243 provided with a U-shaped groove 245 and the slider raw material 201 are adhered to each other in one body with a non-magnetic substance 246 such as glass bonding with a magnetic gap 7 provided therebetween. Next, in a process (b), the magnetic head core raw material 243 is excised so that the non-magnetic substance 246 is exposed, and, in a process (c), a slit is formed on a surface where the magnetic gap 7 is formed, and a non-magnetic substance 247 such as glass bonding is filled in the slit. Next, in a process (d), notches 202 are formed so as to leave the non-magnetic substance 247, and, in a process (e), a non-magnetic substance such as glass bonding is filled in these notches 202, and the surface forming the magnetic gap 7 and the side face 2B of the magnetic head core raw material 243 exposed from the non-magnetic substance 246 are mirror finished. Next, in a process (f), grooves 102 are processed so as to form floatation rail portions 101, which are cut off at the grooves 102, and air inflow side inclined surfaces 10 and air outflow side inclined surfaces 9 are processed in a process (g), thereby to complete the slider 2 in which a magnetic head core as shown in FIG. 4 is formed in one body. This slider 2 is produced automatically by machining.

Figure 10:
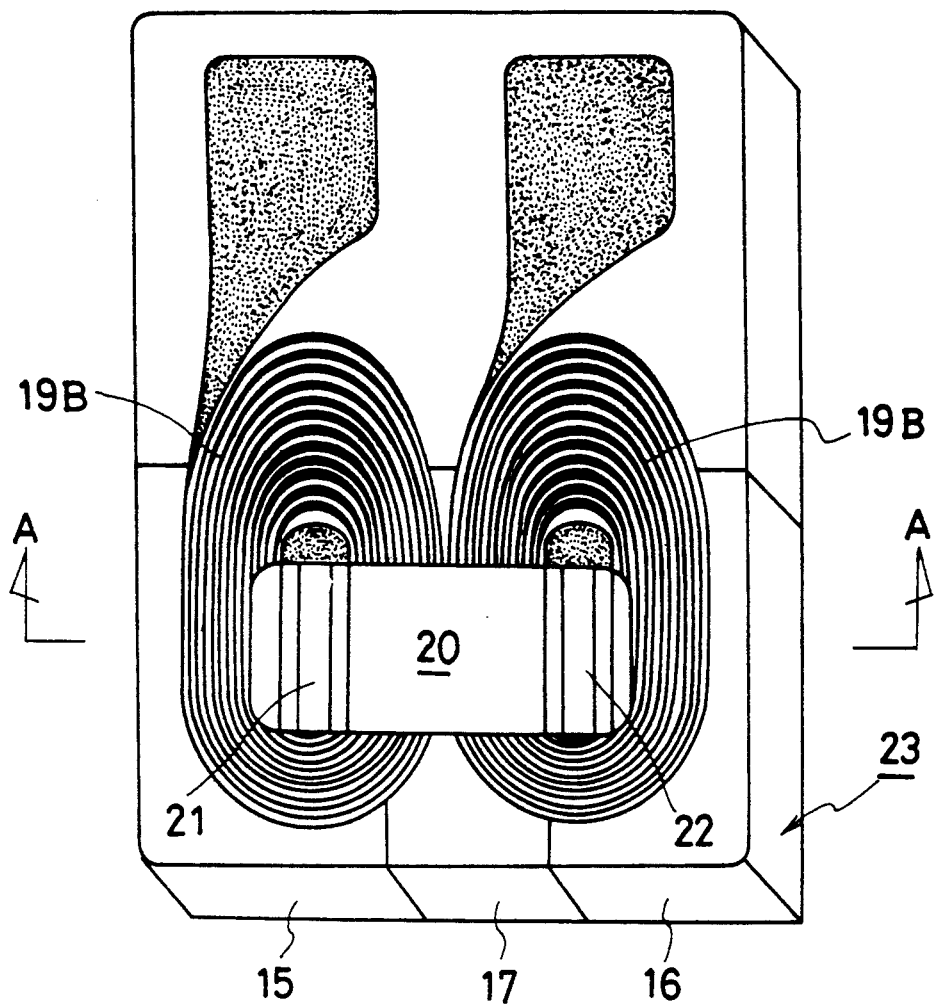
FIG. 10 is a perspective view of a thin film conductor coil assembly in FIG. 1.
Figure 11:
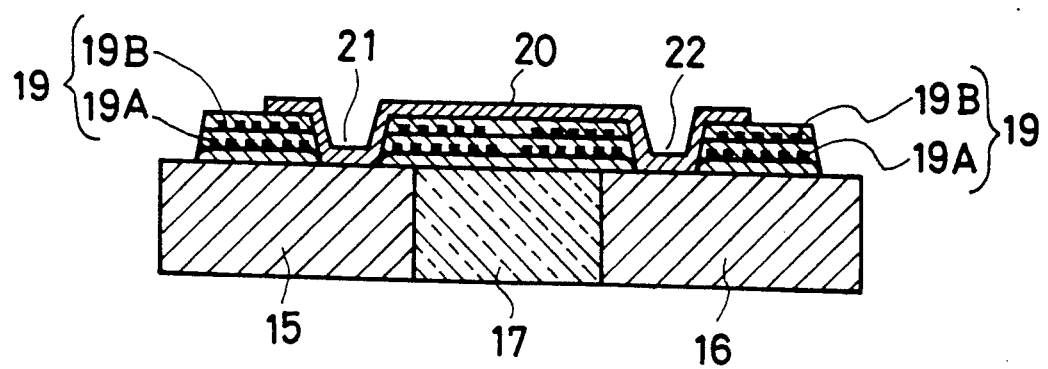
FIG. 11 is a longitudinal sectional view taken along a line A—A in FIG. 10.

Next, the thin film conductor coil assembly 14 shown in FIG. 1 and FIG. 4 will be described. In FIG. 10 and FIG. 11, the thin film conductor coil assembly 14 is structured as follows. Magnetic substances 15 and 16 are adhered with a non-magnetic substance 17 to form one integral body, thus forming a substrate 23. A magnetic core 20 having cores 21 and 22 is provided on the substrate 23, and thin film conductor coils 19 are formed on the substrate 23 with these magnetic cores 21 and 22 as cores. In the present embodiment, each of the thin film conductor coils 19 is formed in two layers 19A and 19B, and balance winding is made with two magnetic cores 21 and 22 as cores.

Next, production of the thin film conductor coil assembly 14 will be described with reference to FIGS. 12(a)–12(d). In a first process (a), the substrate 23 is produced by adhering magnetic substances 15 and 16 (such as ferrite) with a non-magnetic substance 17 to form one integral body. The production of the substrate 23 is performed by forming a recessed groove in a magnetic substance raw material by machining, filling molten non-magnetic substance in this recessed groove and solidifying it, and applying a grinding process thereafter to show a mirror finished surface on both surfaces of the magnetic substance raw material. Next, in a second process (b), the first layer thin film conductor coils 19A are formed by well-known techniques after forming a first insulating layer 29A on the mirror finished surface of the substrate 23. Next, in a third process (c), the second layer thin film conductor coils 19B are formed by well-known techniques after forming a second layer insulating film 29B on the first layer thin film conductor coils 19A. Then, in a fourth process (d), a magnetic core 20 is formed to complete the production after forming a third layer insulating film 29C on the second layer thin film conductor coil 19B.

In the production of the thin film conductor coil assembly 14, the first, the second and the third insulating films 29A, 29B and 29C are formed with an organic resin insulating film such as photoresist and polyimide or an inorganic insulating film such as $SiO_2$ and $Al_2O_3$ by well-known techniques, and the first and the second thin film conductor coils 19A and 19B are formed by a method of forming by copper plating by a frame plating method using a resist frame, a method of etching a conductor thin film such as copper using a photoresist mask or the like. Then, the magnetic core 20 is formed by a method in which through holes for forming cores 21 and 22 of the magnetic core 20 are bored by etching and a magnetic film such as permalloy is plated by a frame plating method using a resist frame, or a method of etching a magnetic thin film such as permalloy using a resist mask, or a method of adhering a U-shaped magnetic core. The thin film conductor coil assembly 14 is produced automatically in such a manner.

The thin film conductor coil assembly 14 produced as described above is mounted on the slider 2 as shown in FIG. 13. Namely, as described with reference to FIG. 1 and FIG. 2, the magnetic head core 241 (composed of: (a) the I-core 24 formed in one body by adhering magnetic substances 25 and 26 (formed from magnetic head core raw material 243) to each other with the non-magnetic substance 246 and (b) the U-shaped core 27) is inserted into the slit 2A provided on the slider 2 and fixed thereto, and the side surface 2B of the slider 2 and the surface of the I-core 24 are made flush with each other and mirror finished. Further, the thin film conductor coil assembly 14 is adhered to the I-core 24 and the side surface 2B so that the magnetic substances 15 and 16 and the non-magnetic substance 17 of the substrate 23 of the thin film conductor coil assembly 14 and the magnetic substances 25 and 26 and the non-magnetic substance 246 of the I-core 24 are respectively placed in contact with one another. By mounting the thin film conductor coil assembly 14 on the slider 2 in such a manner, a magnetic path 34 is formed by means of the magnetic substances 25 and 26 of the I-core 24, the magnetic substances 15 and 16 and the magnetic core 20 of the thin film conductor coil assembly 14, and the U-shaped core 27 through the magnetic gap 7. In the case of an embodiment shown in FIG. 4 in which the magnetic head core and the slider are formed in one body, the U-shaped core 27 shown in FIG. 3 also serves as the slider 2 itself as is apparent from FIG. 5. Therefore, it is possible to mount the thin film conductor coil assembly 14 on the slider 2 in a manner similar to that shown in FIG. 13, thus forming the magnetic path 34 in a similar manner. 29 represents the insulating material.

Figure 14:
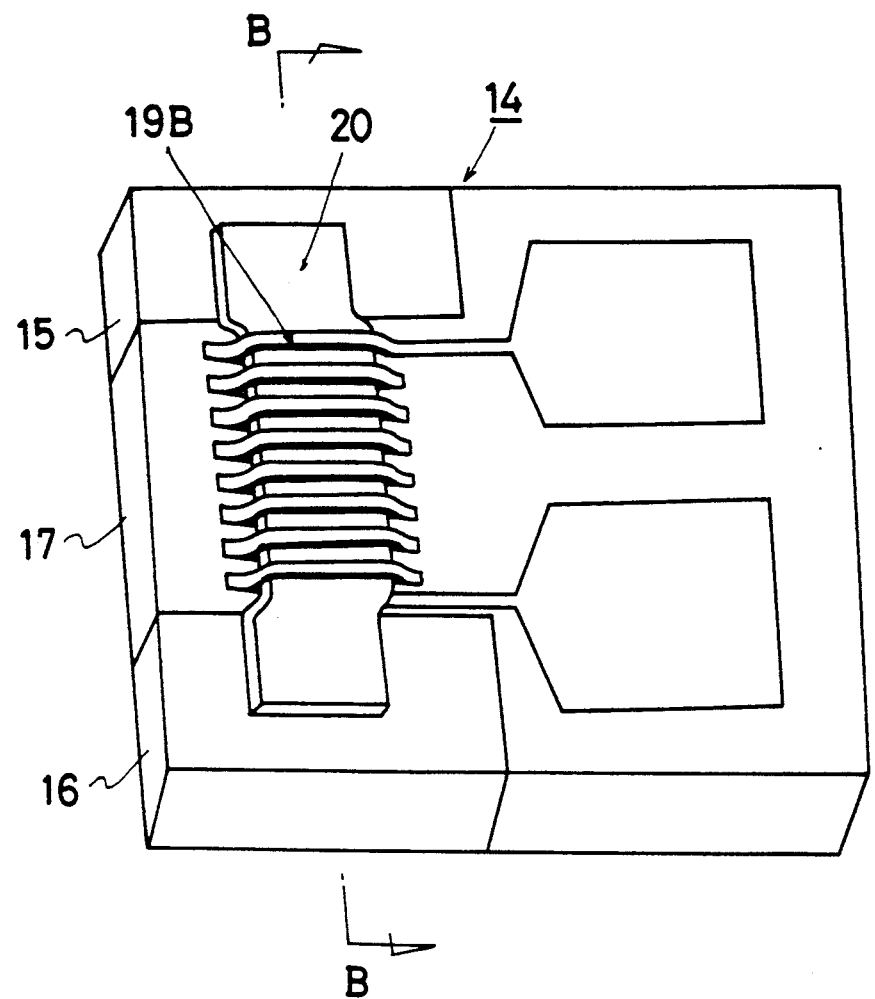
FIG. 14 is a perspective view of a thin film conductor coil assembly in which the thin film conductor coil is wound in a spiral form.
Figure 15:
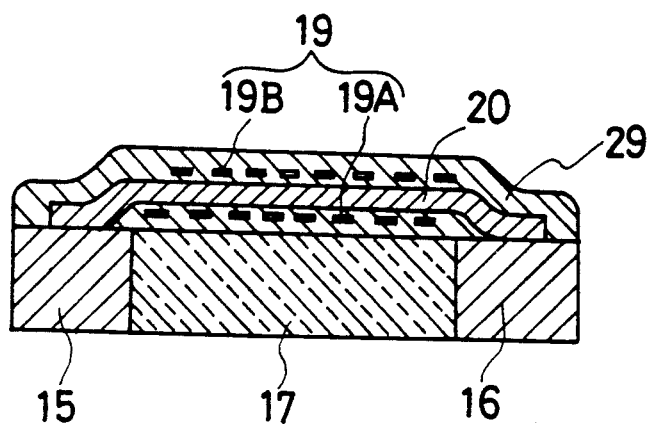
FIG. 15 is a longitudinal sectional view taken along a line B—B in FIG. 14.

FIG. 14 and FIG. 15 show another embodiment of the thin film conductor coil assembly 14. In the present embodiment, a thin film conductor coil 19 is wound in a spiral form around a magnetic core 20 provided by being connected magnetically at both ends thereof to magnetic substances 15 and 16 so as to step across (i.e., span) the non-magnetic substance 17 of a substrate formed by the magnetic substances 15 and 16 formed in one body with the non-magnetic substance 17 therebetween. Further, in still another embodiment shown in FIG. 16 and FIG. 17, the thin film conductor coil 19 is wound in a layer form around the magnetic core 20 in the embodiment shown in FIG. 14. As to the other portions, the same symbols are assigned to those that are the same as FIG. 14 and FIG. 15, and description thereof is omitted herein.

Figure 16:
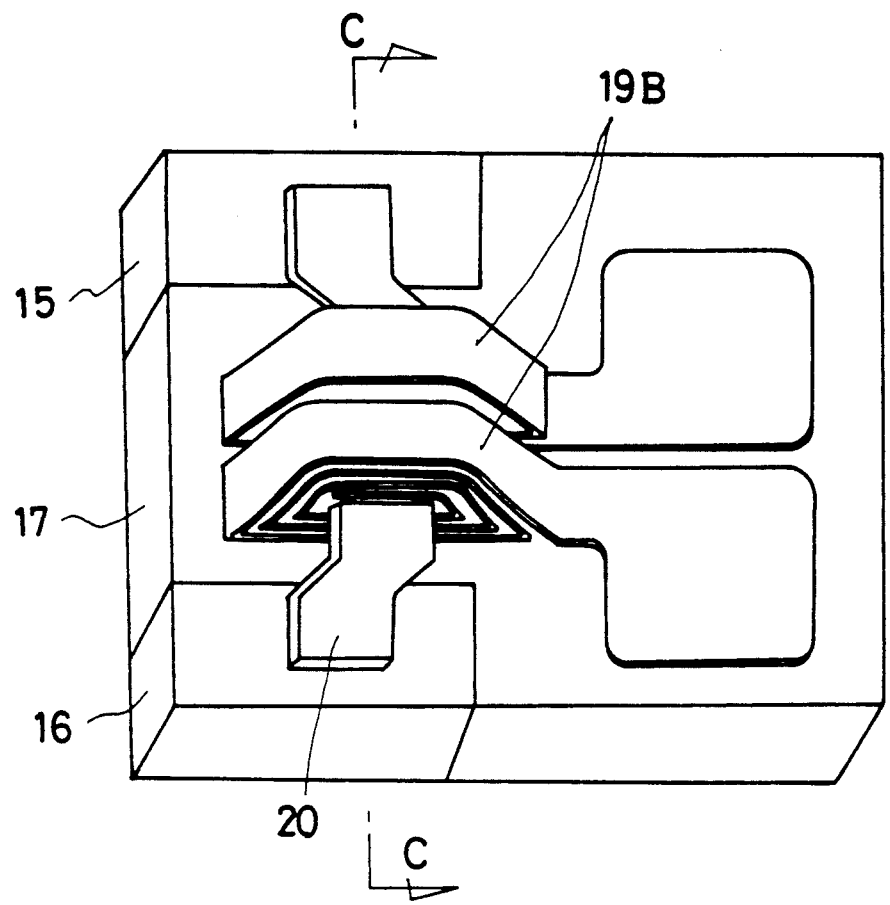
FIG. 16 is a perspective view of a thin film conductor coil assembly in which a thin film conductor coil is wound in a layer form.
Figure 17:
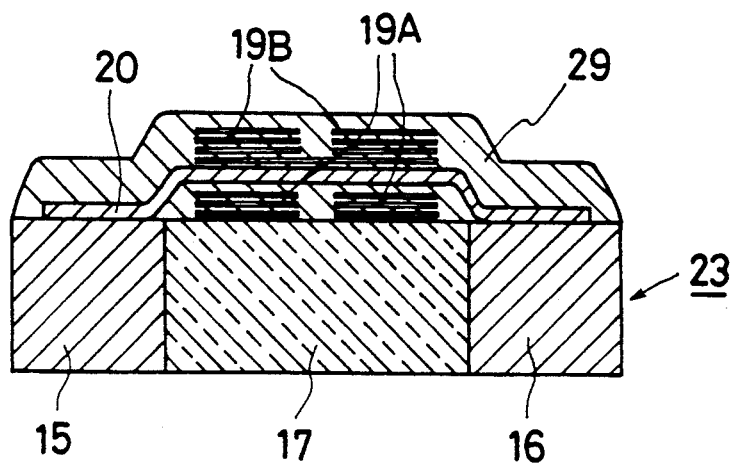
FIG. 17 is a longitudinal sectional view taken along a line C—C in FIG. 16.

In the production of the thin film conductor coil assembly 14 shown in FIG. 14 and FIG. 16, the insulating film 29 (four layers in the embodiment shown in FIG. 15, and nine layers in the embodiment shown in FIG. 19) is formed with an organic resin insulating film such as photoresist and polyimide or an inorganic insulating film such as $SiO_2$ and $Al_2O_3$ by well-known techniques similarly to the thin film conductor coil assembly 14 shown in FIG. 10, and the first and the second thin film conductor coils 19A and 19B are formed by a method of forming by copper plating by a frame plating method using a resist frame, or a method of etching a conductor thin film such as copper using a photoresist mask. Further, the magnetic core 20 is formed by a method in which through holes for connecting the end portions of the magnetic core 20 to the magnetic substances 15 and 16 magnetically are formed by etching, and magnetic film such as permalloy is plated by a frame plating method using a resist frame, a method of etching a magnetic thin film such as permalloy using a resist mask, or a method of adhering a U-shaped magnetic core.

Figure 4:
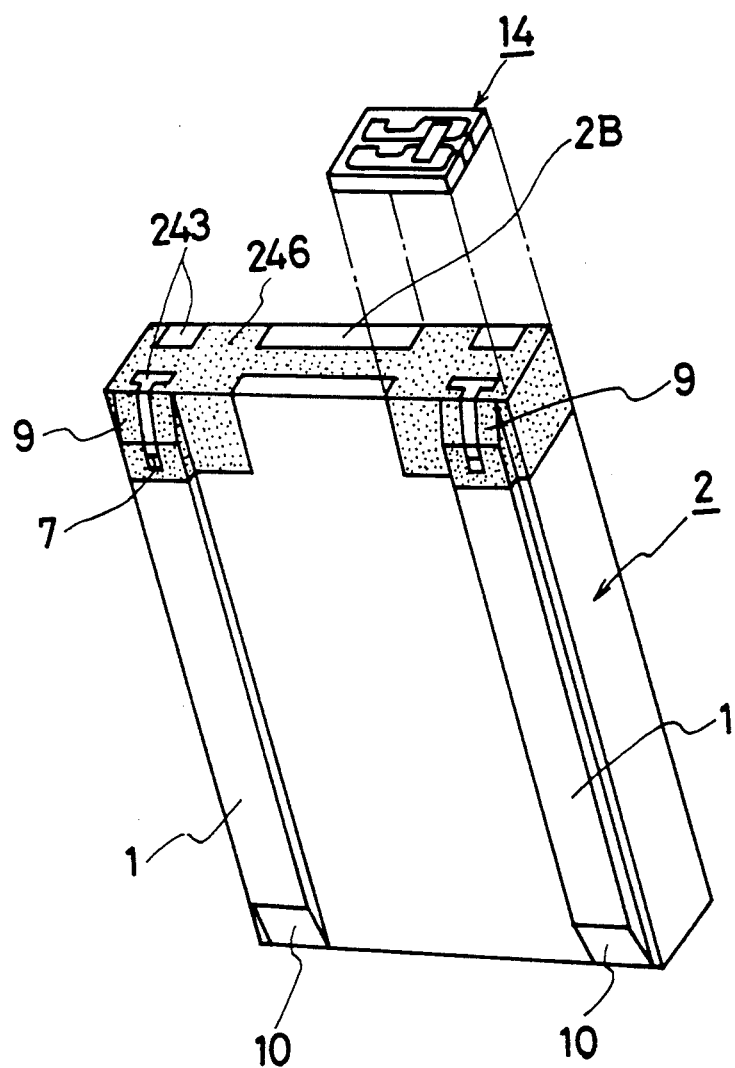
FIG. 4 is a perspective view showing another embodiment of the present invention.
Figure 5:
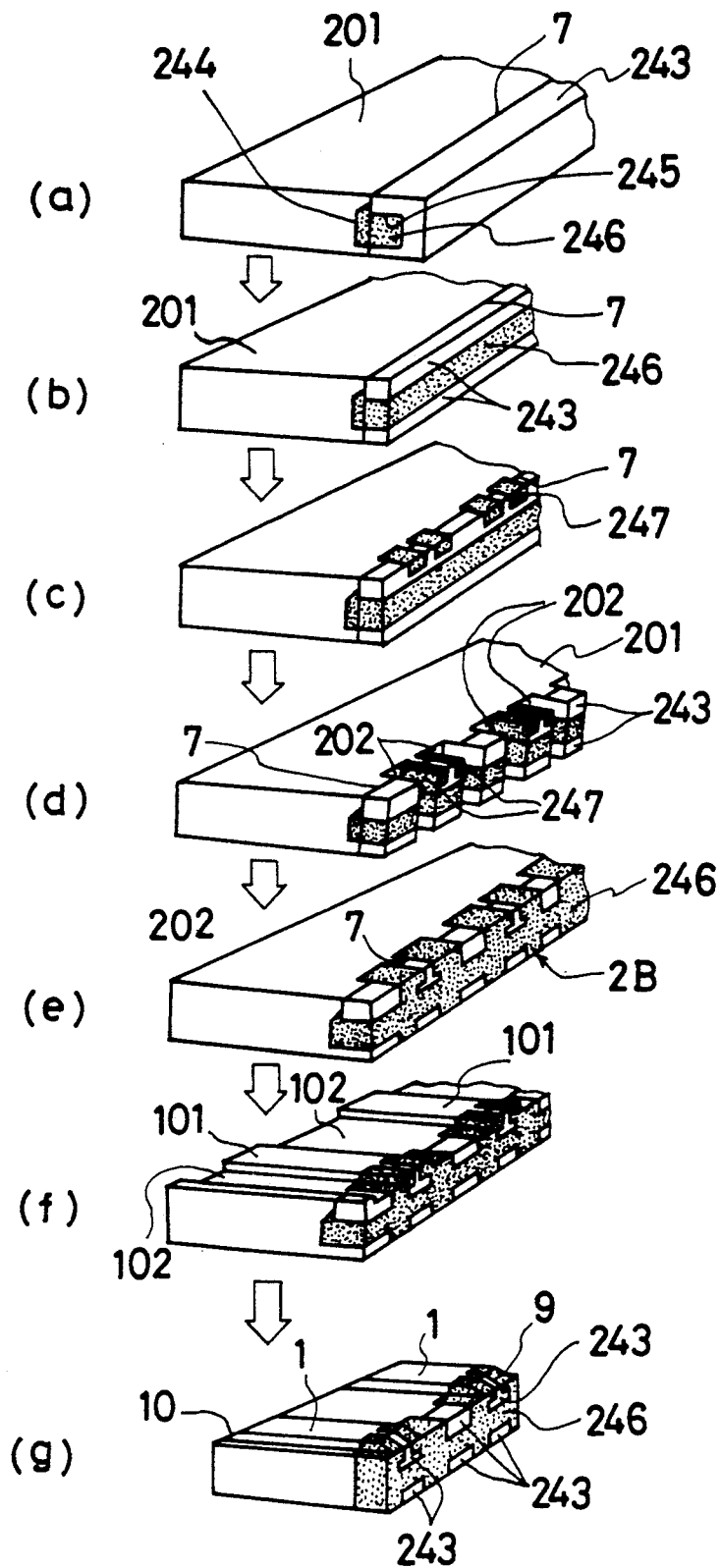
FIGS. 5(a)-5(g) are perspective views showing a production process of a slider in FIG. 4.
Figure 6:
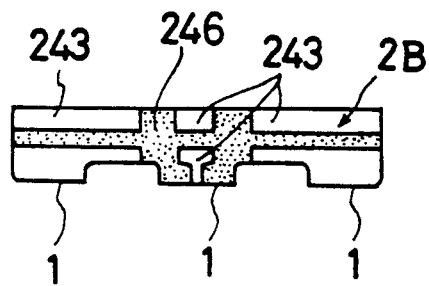
FIG. 6 is a front view showing an example of a slider having three floatation rails.
Figure 13:
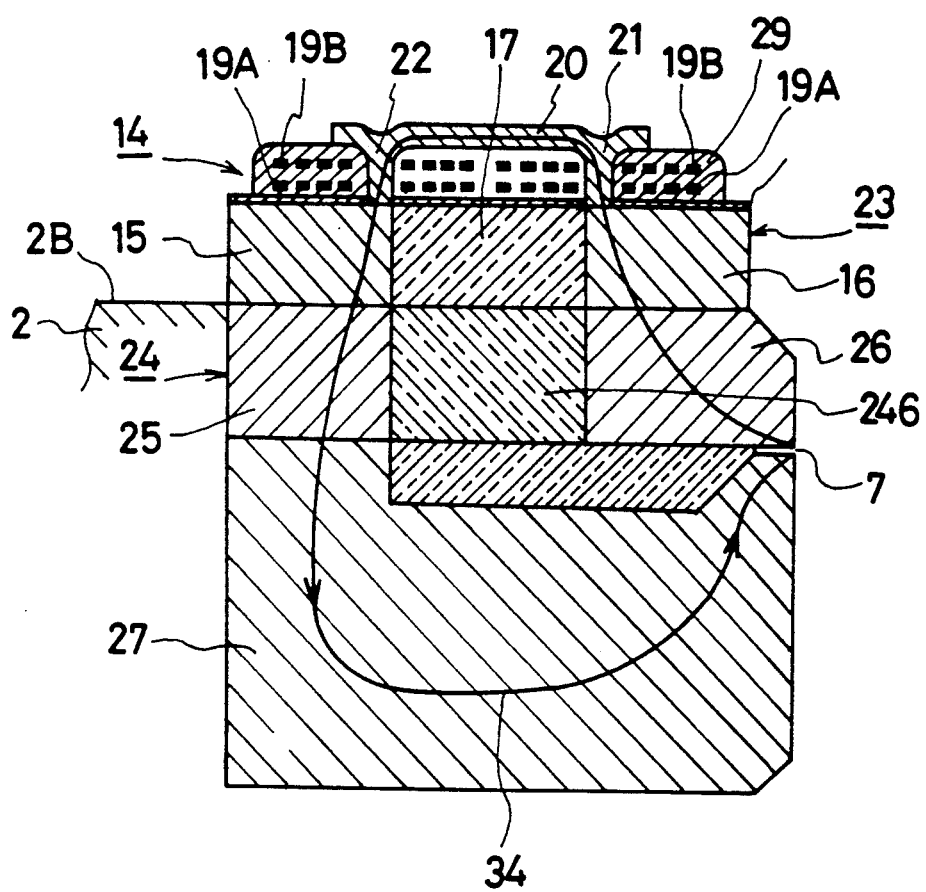
FIG. 13 is a longitudinal sectional view showing a state where the thin film conductor coil assembly is adhered to the slider.
Figure 18:
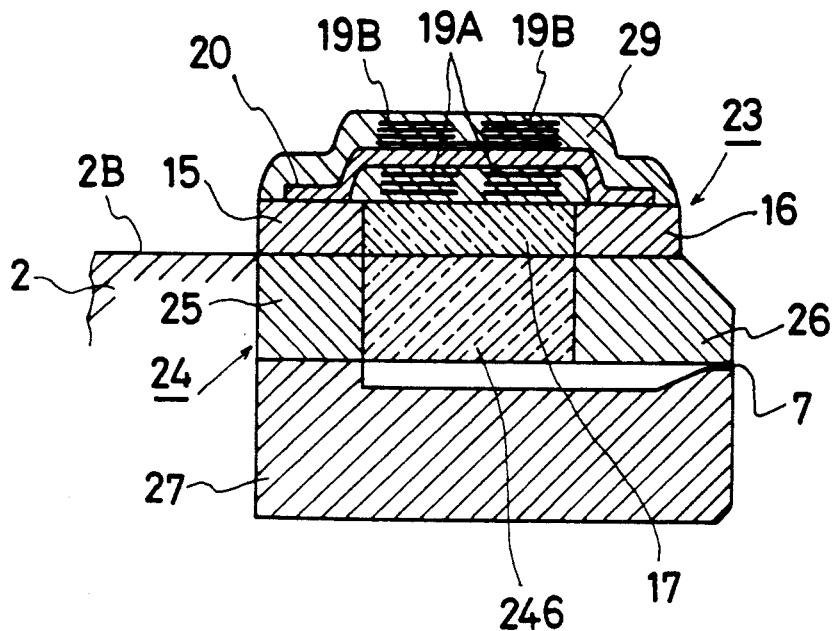
FIG. 18 is a longitudinal sectional view showing a state that the thin film conductor coil assembly shown in FIG. 16 is adhered to the slider.
Figure 19:
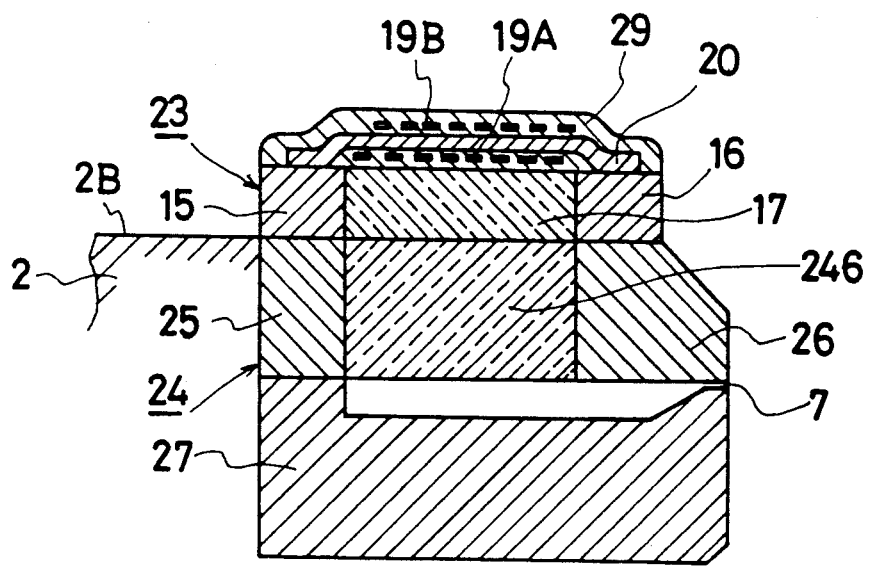
FIG. 19 is a longitudinal sectional view showing a state that the thin film conductor coil assembly shown in FIG. 14 is adhered to the slider.
Figure 20:
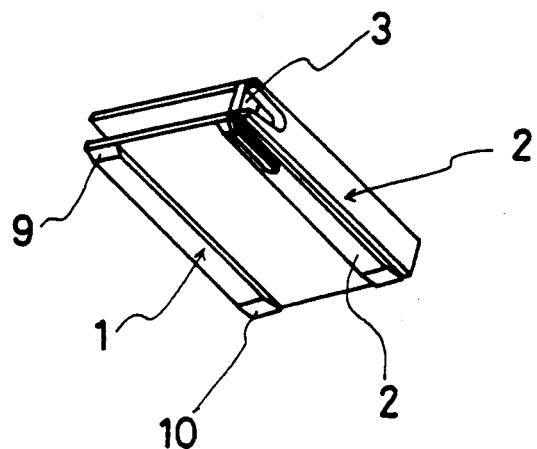
FIG. 20 is a perspective view of a conventional magnetic head.
Figure 21:
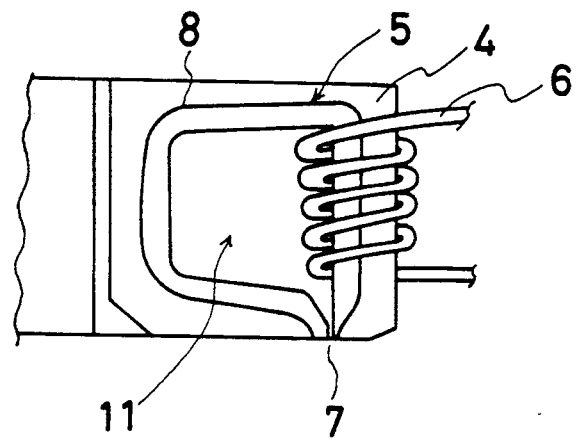
FIG. 21 is a side view of a conductor coil in FIG. 20.
Figure 22:
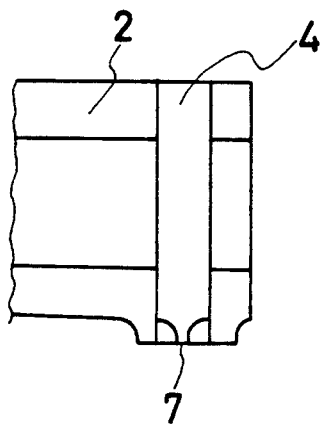
FIG. 22 is a right side view of FIG. 21.
Figure 23:
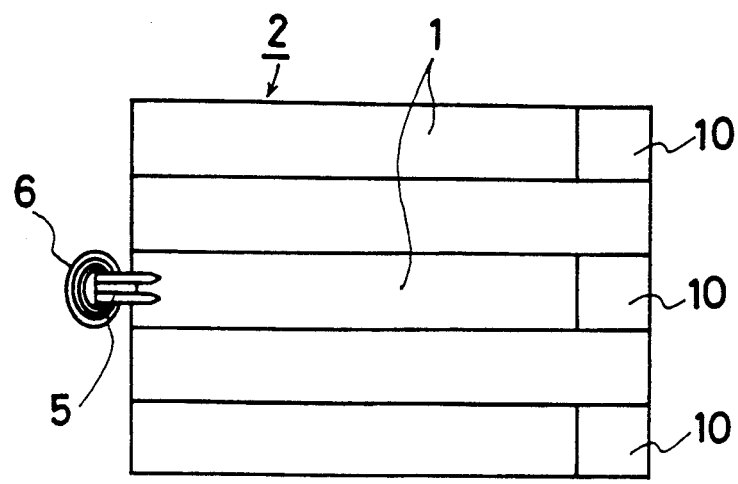
FIG. 23 is a plan view of a conventional example having three floatation rails.
Figure 24:
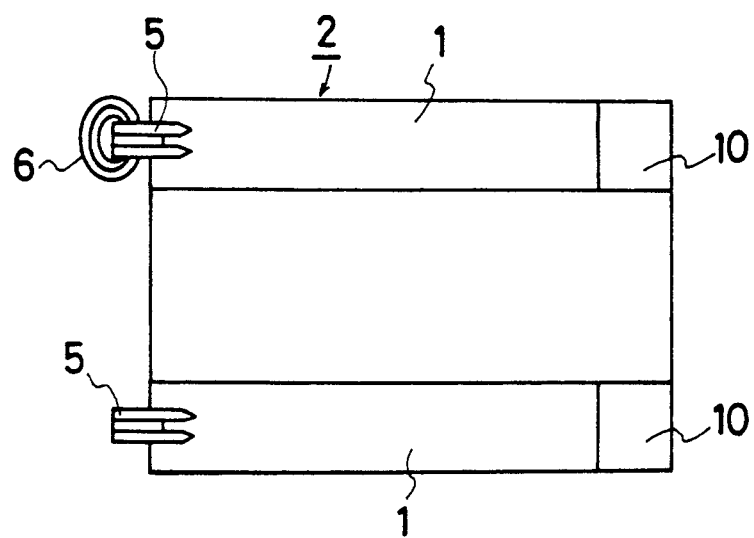
FIG. 24 is a plan view of a conventional example having two floatation rails.
Figure 25:
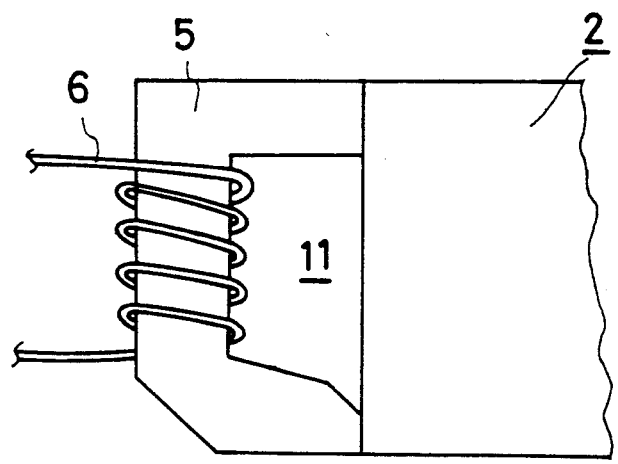
FIG. 25 is a side view of the conductor coil in FIG. 23 and FIG. 24.
Figure 26:
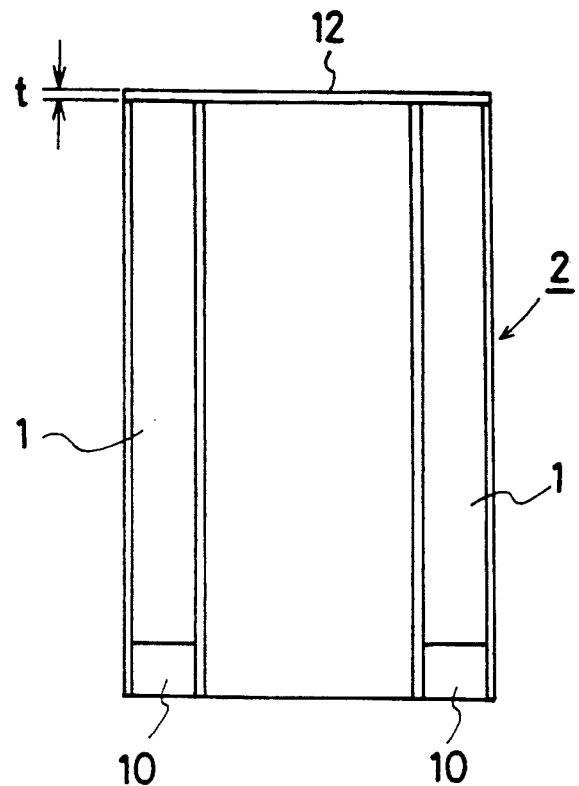
FIG. 26 is a plan view of a conventional example having a thin film conductor coil.
Figure 27:
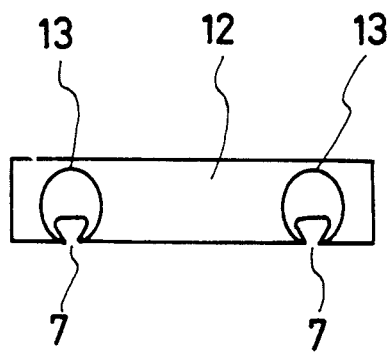
FIG. 27 is a front view of FIG. 26.

Next, a way of mounting the thin film conductor coil assembly 14 shown in FIG. 14 and FIG. 16 on the slider 2 shown in FIG. 1 and FIG. 4 is similar to the case of the thin film conductor coil assembly 14 shown in FIG. 10. Namely, as shown in FIG. 18 for the thin film conductor coil assembly 14 shown in FIG. 16 and as shown in FIG. 19 for the thin film conductor coil assembly 14 shown in FIG. 14, the thin film conductor coil assembly 14 is adhered to the I-core 24 and the side surface 2B so that the magnetic substances 15 and 16 and the non-magnetic substance 17 of the substrate 23 of the thin film conductor coil assembly 14 and the magnetic substances 25 and 26 and the non-magnetic substance 246 of the I-core 24 are respectively placed in contact with one another. By mounting the thin film conductor coil assembly 14 on the slider 2 in this manner, the magnetic path 34 as shown in FIG. 13 is formed by means of the magnetic substances 25 and 26 of the I-core 24, the magnetic substances 15 and 16 and the magnetic core 20 of the thin film conductor coil assembly 14 and the U-shaped core 27 through the magnetic gap 7. Further, in the case of the embodiment shown in FIG. 4 in which the magnetic head core and the slider are formed in one body, the U-shaped core 27 shown in FIG. 18 and FIG. 19 also serves as the slider 2 itself as is apparent from FIG. 5. Therefore, it is possible to similarly mount the thin film conductor coil assembly 14 on the slider 2, thus forming the magnetic path 34 as shown in FIG. 13.

The operation of the present embodiment thus structured will next be described. In the thin film conductor coil assembly 14 shown in FIG. 10, FIG. 14 and FIG. 16, the magnetic core 20 connected magnetically to the magnetic substances 15 and 16 located on both sides and stepping across the non-magnetic substance 17 of the substrate 23 is provided, and the thin film conductor coil 19 is formed with this magnetic core 20 as the thin film magnetic core. Thus, it becomes possible to produce the thin film conductor coil 19 only separately from the magnetic head core 241.

Next, in the magnetic head shown in FIG. 1 having a form in which the slider 2 and the magnetic head core 241 are separated from each other, this magnetic head core 241 is produced in such a manner that the I-core 24 (formed by putting the non-magnetic substance 246 between the magnetic substances 25 and 26 in one body on both sides of the non-magnetic substance 246) and the U-shaped core 27 (composed of a magnetic substance) are formed in one integral body with the magnetic gap 7 provided between the magnetic substance 26 on one side of the I-core 24, and the magnetic head core 241 is inserted into the slit 2A of the slider 2 and attached fixedly thereto. Thus, it becomes possible to produce the slider 2 with the magnetic head core 241 formed in one body separately from the thin film conductor coil assembly 14.

Further, in a magnetic head having a type in which the magnetic head core and the slider are formed in one body as shown in FIG. 4, floatation rails 1 are provided on one surface of a quadrilateral magnetic substance having a predetermined thickness parallel to one side of this quadrilateral, and the non-magnetic substance 246 is attached fixedly in one body onto the side surface 2B of the other side orthogonal to these floatation rails 1 so as to expose a part of the magnetic substance 243 on both sides of the non-magnetic substance 246 putting it therebetween and the magnetic gap 7 is provided on one side of the exposed magnetic substance 243, thus forming the slider 2. Therefore, it becomes possible to produce the slider 2 with the magnetic head core formed in one body separately from the thin film conductor coil assembly 14.

Further, in the magnetic head shown in FIG. 1 having a form in which the slider 2 and the magnetic head core 241 are separated from each other, the thin film conductor coil assembly 14 is attached to the magnetic head core 241 and the side surface 2B so that the magnetic substances 25 and 26 and the non-magnetic substance 246 forming the I-core 24 of the magnetic head core 241 fitted and fixedly attached to the slit 2A, and the magnetic substances 15 and 16 and the non-magnetic substance 17 forming the substrate 23 of the thin film conductor coil assembly 14 are respectively placed in contact with one another, thereby to form the magnetic path 34 shown in FIG. 13 through the magnetic core 20 of the thin film conductor coil assembly 14, the magnetic substances 15 and 16 of the substrate 23, the magnetic substances 25 and 26 and the U-shaped core 27 of the magnetic head core 241, and the gap 7. Similarly, in the magnetic head of a type in which the magnetic head core and the slider are formed in one body as shown in FIG. 4, the thin film conductor coil assembly 14 is attaches to the side surface 2B so that the magnetic substance 243 and the non-magnetic substance 246 exposed on the side surface 2B and the magnetic substances 15 and 16 and the non-magnetic substance 17 forming the substrate 23 of the thin film conductor coil assembly 14 are respectively placed in contact with one another, thereby to form the magnetic path 34 shown in FIG. 13 through the magnetic core 20 of the thin film conductor coil assembly 14, the magnetic substances 15 and 16 of the substrate 23, the magnetic substance 243 exposed on the side surface 2B and the gap 7.

Since the thin film conductor coil assembly 14, and the slider 2 and the magnetic head core 241 are produced individually, the production of the thin film conductor coil assembly 14 is not restricted by the magnetic head core 241 or the slider 2 in which the magnetic head core is formed in one body. The thin film conductor coil assembly 14 can be produced in an optional size, thus making miniaturization possible. Further, since the magnetic path 34 is formed through the magnetic core 20 of the thin film conductor coil assembly 14, the magnetic substances 15 and 16 forming the substrate 23, the magnetic substances 25 and 26 forming the magnetic head core 241 or the magnetic substance 243 exposed on the side surface 2B, the area of the magnetic circuit can be determined by selecting the configurations and dimensions of these magnetic substances optionally, thus making it possible to obtain a required magnetic path area. Further, since the thin film conductor coil 19 is formed with the magnetic core 20 as the core, balance winding of the thin film conductor coils 19 becomes possible, and it also becomes possible to form the thin film conductor coils 19 closely to the core.

Figure 12:
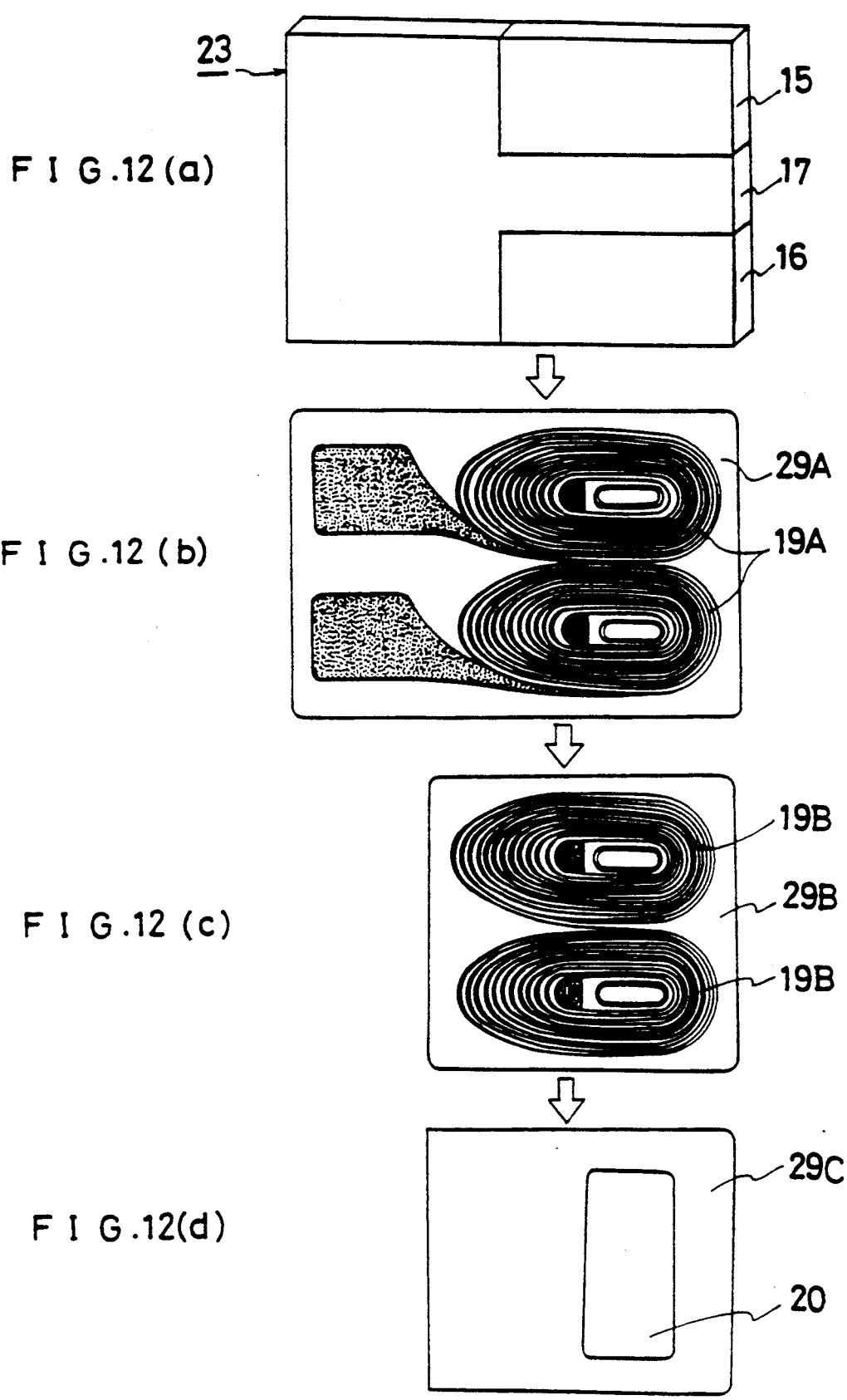
FIGS. 12(a)-12(d) are diagrams showing a production process of the thin film conductor coil assembly shown in FIG. 10.

Further, the thin film conductor coil 19 shown in FIG. 10, FIG. 14 and FIG. 16 is formed by a method of forming by copper plating by a frame plating method using a resist film, a method of etching a conductor thin film such as copper using a photoresist mask or the like as described with reference to FIG. 12. Therefore, breaking of wire and the like will never occur, and the thin film conductor coils 19 having high yield and high reliability are obtainable.

As described in detail above, according to the present invention, a magnetic core is connected magnetically to the magnetic substances located on both sides of the non-magnetic substance of the thin film conductor coil assembly substrate, the thin film conductor coil is formed with this magnetic core as the thin film magnetic core so as to form a thin film conductor coil assembly, and this thin film conductor coil assembly is attached to the slider provided with the magnetic head core. Thus, it is possible to produce a thin film conductor coil assembly in an optional size irrespective of the magnetic head core.

Further, a magnetic head core is formed of an I-core in which magnetic substances are formed in one body on both sides of a non-magnetic substance, and a U-shaped core composed of a magnetic substance, as one integral body, with a magnetic gap provided between one of the magnetic substances of the I-core and the U-shaped core. This magnetic head core is fitted into a slit formed in a slider composed of a non-magnetic substance having floatation rails, and the thin film conductor coil assembly is attached to the fitted magnetic head core so that the magnetic substance and the non-magnetic substance forming the I-core and the magnetic substances and the non-magnetic substance of the thin film conductor coil assembly are respectively placed in contact with one another. Thus, it is possible to form a magnetic path by the magnetic core of the thin film conductor coil assembly, the magnetic substances of the substrate, the magnetic substance of the I-core forming the magnetic head core, the U-shaped core and the gap, and to enlarge the sectional area of the magnetic path irrespective of the thin film conductor coil.

Further, floatation rails are provided on one surface of a quadrilateral magnetic substance having a predetermined thickness parallel to one side of this quadrilateral, and a non-magnetic substance is fixedly attached in one body to the side surface on the other side orthogonal to the floatation rails so that a part of the magnetic substance is exposed on both sides with the non-magnetic substance therebetween. A magnetic gap is provided on one side of the exposed magnetic substance thereby to form a slider portion, and the thin film conductor coil assembly is attached to the thickness surface of the slider so that the magnetic substance and the non-magnetic substance formed on the side surface of the slider portion and the magnetic substances and the non-magnetic substance of the thin film conductor coil assembly are respectively placed in contact with one another, thus making it possible to form a magnetic path by the magnetic core of the thin film conductor coil assembly, the magnetic substances of the substrate, the magnetic substance exposed on the side surface of the slider and the gap, and to enlarge the sectional area of the magnetic path optionally irrespective of the thin film conductor coil.

Since it is possible to produce a thin film conductor coil individually irrespective of the magnetic head core as described above, it is possible to miniaturize the thin film conductor coil in an optional size and also to enlarge the magnetic path area optionally irrespective of the thin film conductor coil. Accordingly, it is possible to improve recording and reproducing characteristics by reducing magnetic resistance even if the diameter of a magnetic disc is small, thereby to provide a magnetic head which is able to correspond to miniaturization of a magnetic disc.

Further, since balance winding of the thin film conductor coil is possible, the magnetic noises can be eliminated, and the core and the thin film conductor coil can be brought close to each other by forming the thin film conductor coil with the magnetic core as a core. Therefore, it is possible to improve electromagnetic conversion efficiency of the magnetic head. Further, since the thin film conductor coil assembly is produced individually separately from the magnetic head core, it becomes possible to apply well-known techniques using an organic resin insulating film such as photoresist and polyimide and a well-known method of formation by copper plating by a frame plating method using a resist frame for forming the thin film conductor coil and the insulating layer, thus making it possible to improve yield and reliability affected by breaking of wire and poor insulation, and also to improve productivity because the thin film conductor coil assembly, the magnetic head core and the slider can be produced automatically.

What is claimed is:

1. A magnetic head comprising:
a magnetic head core assembly having an I-core defined by magnetic substances attached on oppositely facing side surfaces of a non-magnetic substance, and a U-shaped core having a non-magnetic substance located in a space portion on an open side of a U-shaped magnetic substance, said I-core attached to said U-shaped core so that the magnetic substance on one of the side surfaces of the I-core is attached to one side of the U-shaped magnetic substance, and the magnetic substance on the other side of the I-core is opposed to a second side of the U-shaped magnetic substance with a magnetic gap therebetween, said magnetic head being provided on a slider having a pair of rails composed of a non-magnetic substance so that said magnetic gap is located on a same surface of said slider as said rails; and
a thin film conductor coil assembly including a substrate defined by magnetic substances attached on oppositely facing sides of another non-magnetic substance, a thin film magnetic core magnetically connecting said magnetic substances of the substrate to each other while spanning across said magnetic substance of said substrate, and a thin film conductor coil formed around said thin film magnetic core, said substrate attached to the corresponding non-magnetic and magnetic substances of said I-core.

2. A magnetic head according to claim 1, wherein said magnetic head core assembly is fitted and attached into a slit provided in at least one of the rails.

3. A magnetic head according to claim 1, wherein said magnetic head core assembly is fabricated in one body with the slider.

4. A magnetic head according to claim 1, wherein said slider includes three rails.

5. A magnetic head according to claim 1, wherein said thin film conductor coil assembly includes a thin film conductor coil wound in a spiral form around said magnetic core.

6. A magnetic head according to claim 5, wherein said thin film conductor coil is wound in a layer form.

7. A magnetic head comprising:
a slider having a plurality of surfaces and at least two rails located on a first one of said surfaces;
a magnetic head core including:
a U-shaped magnetic member attached to said slider and having first and second ends defined by ends of upstanding portions of the U-shaped member, and a non-magnetic substance located in an open portion of said U-shaped member; and
an I-core defined by first and second magnetic members attached to oppositely facing sides of a non-magnetic substance, said I-core attached to said U-shaped magnetic member so that the first magnetic member and said second magnetic member is opposed to the second end of said U-shaped magnetic member with a magnetic gap therebetween, said magnetic gap located on said slider surface containing said rails; and
a thin film conductor coil assembly including:
a substrate attached to said I-core and defined by third and fourth magnetic members attached on opposite sides of a non-magnetic substance, said third magnetic member attached to said first magnetic member and said fourth magnetic member attached to said second magnetic member;

a thin film magnetic core magnetically connecting said third and fourth magnetic members to each other and extending across the non-magnetic substance of said thin film conductor coil assembly; and a thin film conductor coil extending around said thin film conductor core;

wherein a magnetic path is defined through said first magnetic member, said third magnetic member, said thin film magnetic core, said fourth magnetic member, said second magnetic member, said U-shaped magnetic member and said magnetic gap.

8. A magnetic head according to claim 7, wherein said slider includes a slit formed in a second one of said surfaces orthogonal to said first surface, said slit extending into one of said rails, said magnetic head core located in said slit.

9. A magnetic head according to claim 8, wherein said slider is formed of a non-magnetic substance.

10. A magnetic head according to claim 7, wherein said U-shaped magnetic member is an end of said slider having a second one of said surfaces which is orthogonal to said first surface.

11. A magnetic head comprising:

a slider formed from a magnetic substance and having a plurality of surfaces and at least two rails located on a first one of said surfaces;

a magnetic head core formed in one body with said slider and including:

a U-shaped magnetic member formed from said slider magnetic substance, and having first and second ends defined by ends of up-standing portions of the U-shaped member, and a non-magnetic substance located in an open portion of said U-shaped member; and an I-core defined by first and second magnetic members attached to oppositely facing sides of a non-magnetic substance, said I-core attached to said U-shaped magnetic member so that the first magnetic member is attached to the first end of said U-shaped magnetic member and said second magnetic member is opposed to the second end of said U-shaped magnetic member with a magnetic gap therebetween, said magnetic gap located on said slider surface containing said rails; and a thin film conductor coil assembly including:

a substrate attached to said I-core and defined by third and fourth magnetic members attached on opposite sides of a non-magnetic substance, said third magnetic member attached to said first magnetic member and said fourth magnetic member attached to said second magnetic member;

a thin film magnetic core magnetically connecting said third and fourth magnetic members to each other and extending across the non-magnetic substance of said thin film conductor coil assembly; and a thin film conductor coil extending around said thin film conductor core;

wherein a magnetic path is defined through said first magnetic member, said third magnetic member, said thin film magnetic core, said fourth magnetic member, said second magnetic member, said U-shaped magnetic member and said magnetic gap.

* * * * *